US011936949B2

(12) United States Patent
Jatti et al.

(10) Patent No.: US 11,936,949 B2
(45) Date of Patent: Mar. 19, 2024

(54) METHOD AND SYSTEM FOR HDMI SMART ERROR RECOVERY AND RECOMMENDED ACTIONS

(71) Applicant: ARRIS Enterprises LLC, Suwanee, GA (US)

(72) Inventors: Vinod Jatti, Bangalore (IN); Virendra Singh, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/449,961

(22) Filed: Oct. 5, 2021

(65) Prior Publication Data
US 2022/0150584 A1    May 12, 2022

Related U.S. Application Data

(60) Provisional application No. 63/112,845, filed on Nov. 12, 2020.

(51) Int. Cl.
*H04N 21/4425*    (2011.01)
*H04N 21/41*    (2011.01)
(Continued)

(52) U.S. Cl.
CPC ... *H04N 21/44231* (2013.01); *H04N 21/4104* (2013.01); *H04N 21/43635* (2013.01); *H04N 21/4425* (2013.01)

(58) Field of Classification Search
None
See application file for complete search history.

(56) References Cited

U.S. PATENT DOCUMENTS 6,934,396 B1 * 8/2005 Leapman .................. H04R 5/04
381/59
7,900,237 B2    3/2011 Kwon et al.
(Continued)

FOREIGN PATENT DOCUMENTS

| CN | 104486411 A | * | 4/2015 | ........... H04N 21/254 |
| KR | 2007028053 A | * | 3/2007 | ....... G01R 19/16566 |

(Continued)

OTHER PUBLICATIONS

Notification of Transmittal of the International Search Report (Forms PCT/ISA/220 and PCT/ISA/210) and the Written Opinion of the International Searching Authority (Form PCT/ISA/237) dated Jan. 20, 2022, by the International Application Division Korean Intellectual Property Office in corresponding International Application No. PCT/US2021/053542. (9 pages).

(Continued)

*Primary Examiner* — William J Kim
(74) *Attorney, Agent, or Firm* — Panitch Schwarze Belisario & Nadel LLP (57) ABSTRACT

Methods and set-top boxes are disclosed for automated error detection. The method includes detecting, on an electronic device, a display device connected to the electronic device via a cable; identifying, on the electronic device, a type of display device connected to the electronic device via the cable; classifying, on the electronic device, the type of display device connected to the electronic device via the cable as one of a specific television model or a regular television model; and executing, on the electronic device, a fix for the specific television model. The method can include detecting, on an electronic device, a HDMI cable-related error from a HDMI transmitter of the electronic device; classifying, on the electronic device, a cause of the HDMI cable-related error from the HDMI transmitter; and communicating, by the electronic device, a recommendation to (Continued)

a user to remedy the HDMI cable-related error detected by the HDMI transmitter.

11 Claims, 5 Drawing Sheets

(51) Int. Cl.
*H04N 21/4363* (2011.01)
*H04N 21/442* (2011.01)

(56) References Cited

U.S. PATENT DOCUMENTS

| | | | |
|---|---|---|---|
| 9,584,871 B2* | 2/2017 | Innes | H04N 21/4122 |
| 9,729,922 B2* | 8/2017 | Chidambaram | H04N 21/4425 |
| 9,912,904 B1* | 3/2018 | Viswanathan | H04N 5/46 |
| 2009/0027554 A1* | 1/2009 | Noh | H04N 5/445 |
| | | | 348/558 |
| 2009/0055854 A1* | 2/2009 | Wright | H04H 60/52 |
| | | | 725/14 |
| 2009/0113248 A1* | 4/2009 | Bock | G06F 11/0748 |
| | | | 714/39 |
| 2009/0119733 A1* | 5/2009 | Hill | H04N 21/4425 |
| | | | 725/117 |
| 2010/0165198 A1* | 7/2010 | Abe | H04N 21/43632 |
| | | | 348/558 |
| 2014/0016684 A1* | 1/2014 | Hong | G09G 5/006 |
| | | | 375/232 |
| 2015/0005899 A1* | 1/2015 | Wakabayashi | H04N 21/41265 |
| | | | 700/17 |
| 2017/0171696 A1* | 6/2017 | Wen | H04W 64/003 |
| 2017/0245003 A1 | 8/2017 | Lee et al. | |
| 2017/0288895 A1* | 10/2017 | Marino | H04N 21/43635 |
| 2017/0289638 A1 | 10/2017 | Mok | |
| 2017/0308453 A1* | 10/2017 | Hardt | G06F 11/2289 |
| 2018/0167149 A1* | 6/2018 | Stilwell | H04R 5/02 |
| 2018/0242032 A1* | 8/2018 | Viswanathan | H04L 65/611 |
| 2019/0179600 A1* | 6/2019 | An | H04N 21/4221 |
| 2020/0004494 A1* | 1/2020 | Woo | H04N 21/4307 |
| 2020/0021878 A1* | 1/2020 | Uno | G09G 5/006 |
| 2020/0135188 A1* | 4/2020 | Burgueno | G10L 15/22 |
| 2021/0405992 A1* | 12/2021 | Bedekar | G16H 40/63 |
| 2022/0078592 A1* | 3/2022 | Qu | H04L 67/55 |

FOREIGN PATENT DOCUMENTS

| | | | | |
|---|---|---|---|---|
| KR | 20090000652 A * | 8/2009 | | H04N 21/25891 |
| KR | 10-2016-0128139 A | 11/2016 | | |
| WO | WO-2007110809 A1 * | 10/2007 | | H04L 12/2803 |

OTHER PUBLICATIONS

International Preliminary Report on Patentability, dated May 16, 2023, issued in corresponding International Application No. PCT/US2021/053542, 5 pages.

* cited by examiner

METHOD AND SYSTEM FOR HDMI SMART ERROR RECOVERY AND RECOMMENDED ACTIONS

FIELD

The present disclosure relates to a method and system for corrective actions for display devices, and more particularly to a method and system for HDMI (High-Definition Multimedia interface) smart error recovery and recommended actions.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access, live television, movies, visual media, and telephony. In order to consume these services, subscribers connect to a private network owned (or co-owned or rented) by the broadband cable operator which is implemented according to the Data Over Cable Service Interface Specification (DOCSIS) standard.

To provide television and data services, a MSO typically uses a Cable Modem Termination System ("CMTS") for the data services and a quadrature amplitude modulation ("QAM") multiplexer for downstream broadcast television, narrow cast and video-on-demand (VoD) traffic signals. These devices may be located at one or more hubs, which are typically connected to a head end via a network according to a networking protocol, such as Ethernet or SONET. A residential cable customer-premises equipment is typically connected to the CMTS and hub via a cable modem and a wireless router that may be combined in a single box which is called a gateway. In order to view video content that is transmitted through the cable modem or gateway, residential customers connect their televisions to a set-top box (STB). Since set-top boxes have recently gained additional features and functionality, they are often referred to as a smart media device ("SMD") and can be considered as the network interface controller for their peripheral devices.

The set-top box can be used by the subscriber to access a variety of multimedia services, including but not limited to live or linear television, digital video recorder (DVR) content, video-on-demand (VoD) content, over-the-top (OTT) content, and others. For example, set-top boxes usually play user selected content, for example, either live or with a digital video recorder (DVR).

HDMI is a proprietary audio/video interface for transmitting uncompressed video data and compressed or uncompressed digital audio data from an HDMI-compliant source device, for example, a set-top box to a television. HDMI implements the EIA/CEA-861 standards, which define video formats and waveforms, transport of compressed and uncompressed LPCM audio, auxiliary data, and implementations of the VESA EDID. HDMI cables continue to increase in the bandwidth or capabilities of what can be transmitted over the cable. For example, many set-top boxes support HDMI as a primary interface to a display device (e.g., television) and uses HDCP (High-bandwidth Digital Content Protection) for client authentication and link protection.

Numerous categories of field issues reported from customers related to HDMI can generally fall under the following categories: (1) specific model of television (TV) or display device is defective and/or with poor or limited capabilities, (2) defective cable or loose connection with the electronic device, and/or (3) more than one receiver connected between the electronic device and display device that is not computable with the electronic device, for example, an unbranded repeater or connector.

SUMMARY

It would be desirable for a method and system for an automated smart error recovery and detection mechanism along with corrective action for HDMI related issues.

In accordance with an aspect, a method is disclosed for automated error detection, the method comprising: detecting, on an electronic device, a display device that is connected to the electronic device via a cable; identifying, on the electronic device, a type of display device connected to the electronic device via the cable; classifying, on the electronic device, the type of display device connected to the electronic device via the cable as one of a specific television model or a regular television model; and executing, on the electronic device, a fix for the specific television model.

In accordance with another aspect, a method is disclosed for automated error detection, the method comprising: detecting, on an electronic device, a HDMI cable-related error from a HDMI transmitter of the electronic device; classifying, on the electronic device, a cause of the HDMI cable-related error from the HDMI transmitter; and communicating, by the electronic device, a recommendation to a user to remedy the HDMI cable-related error detected by the HDMI transmitter.

In accordance with a further aspect, a set-top box is disclosed comprising: a processor configured to: detect a HDMI cable-related error from a HDMI transmitter of the set-top box; classify a cause of the HDMI cable-related error from the HDMI transmitter; and communicate a recommendation to a user to remedy the HDMI cable-related error detected by the HDMI transmitter.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

System for Automated Recovery and Detection for HDMI Issues

Figure 1:
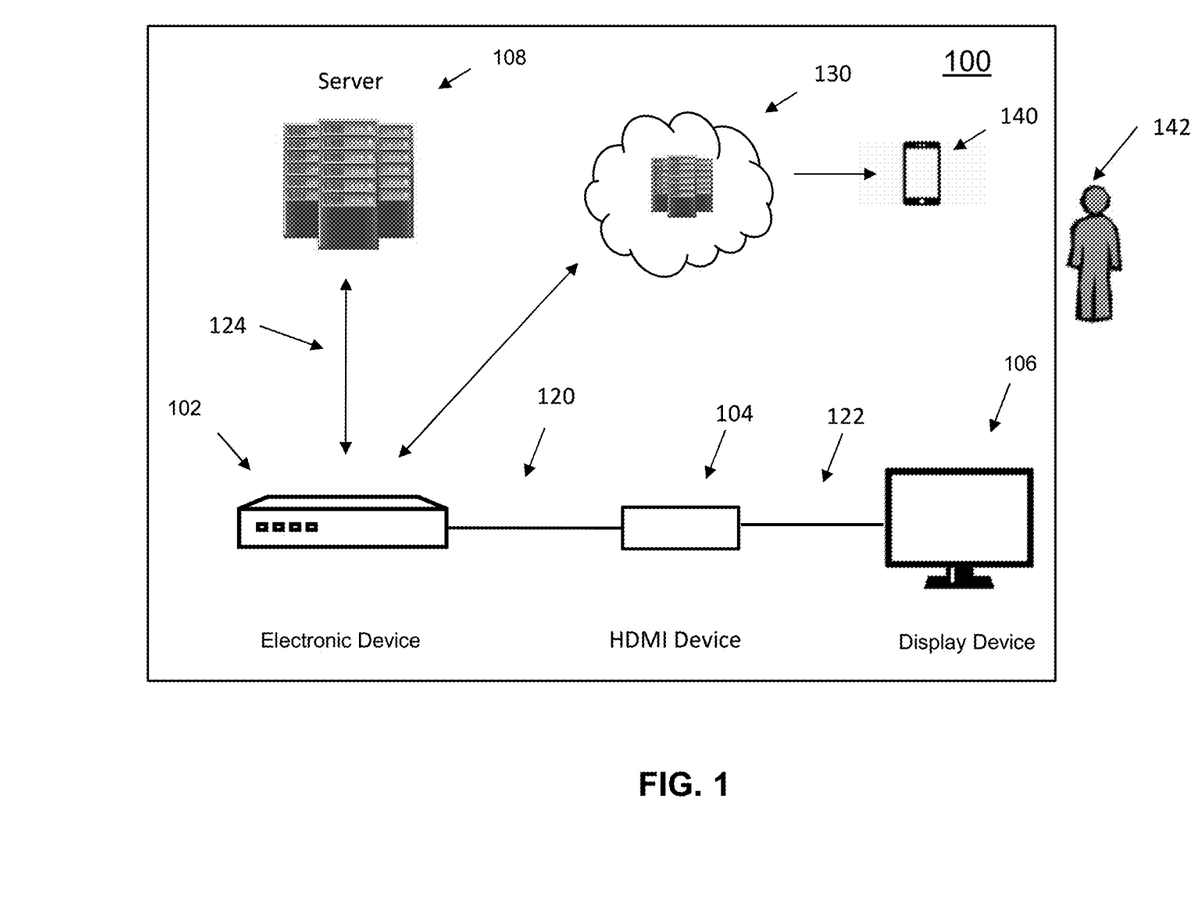
FIG. 1 is a system for an automated smart error recovery and detection mechanism along with corrective action for HDMI related issues in accordance with exemplary embodiments.

FIG. 1 illustrates a consumer set-top entertainment system 100 for an automated smart error recovery and detection mechanism along with corrective action for HDMI related issues in accordance with exemplary embodiments. The system 100 may include an electronic device 102, an optional HDMI compatible device 104, and a display device 106, for example, a television, a cable provider (or MSO) server 108, and a cloud-server 130.

In embodiments, the cable provider (or MSO) server 108 can provide, for example, media content, for example, video and/or data services to the electronic device 102, for example, customer-premises equipment or customer-provided equipment (CPE) (e.g., a set-top box). The electronic device 102, discussed in more detail below, may be a computing device configured to receive source signals that are superimposed or otherwise encoded with a video. For instance, the electronic device 102 may be a set-top box interfaced with the optional HDMI compatible device 104, for example, an audio/video recorder (AVR), a sound bar, and/or a repeater, and/or the display device 106 with one or more HDMI cables 120, 122.

The electronic device 102 may receive a source signal that is electronically transmitted via the cable provider server 108, such as over-the-air, over a cable connection 124 (e.g., via a HDMI cable, component cables, AN (composite) cable, coaxial cable, fiber optic, or other suitable physical cable), via satellite, or other suitable communications medium. For example, the cable provider server 108 may be broadcast television, a local area network, cellular communication network, or the Internet where the source signal may be streamed to the electronic device 102 using the cable provider server 108. In some instances, the source signal may be received from media inserted into one or more suitable input devices of the electronic device 102.

In addition, one or more customers or users 142 can receive notifications, for example, via a Bluetooth proximity audio devices and/or a cloud server 130 can send, for example, SMS notification or text messages to a registered mobile device 140 of the one or more customers or users 142 as disclosed herein.

Computer System Architecture

Figure 2:
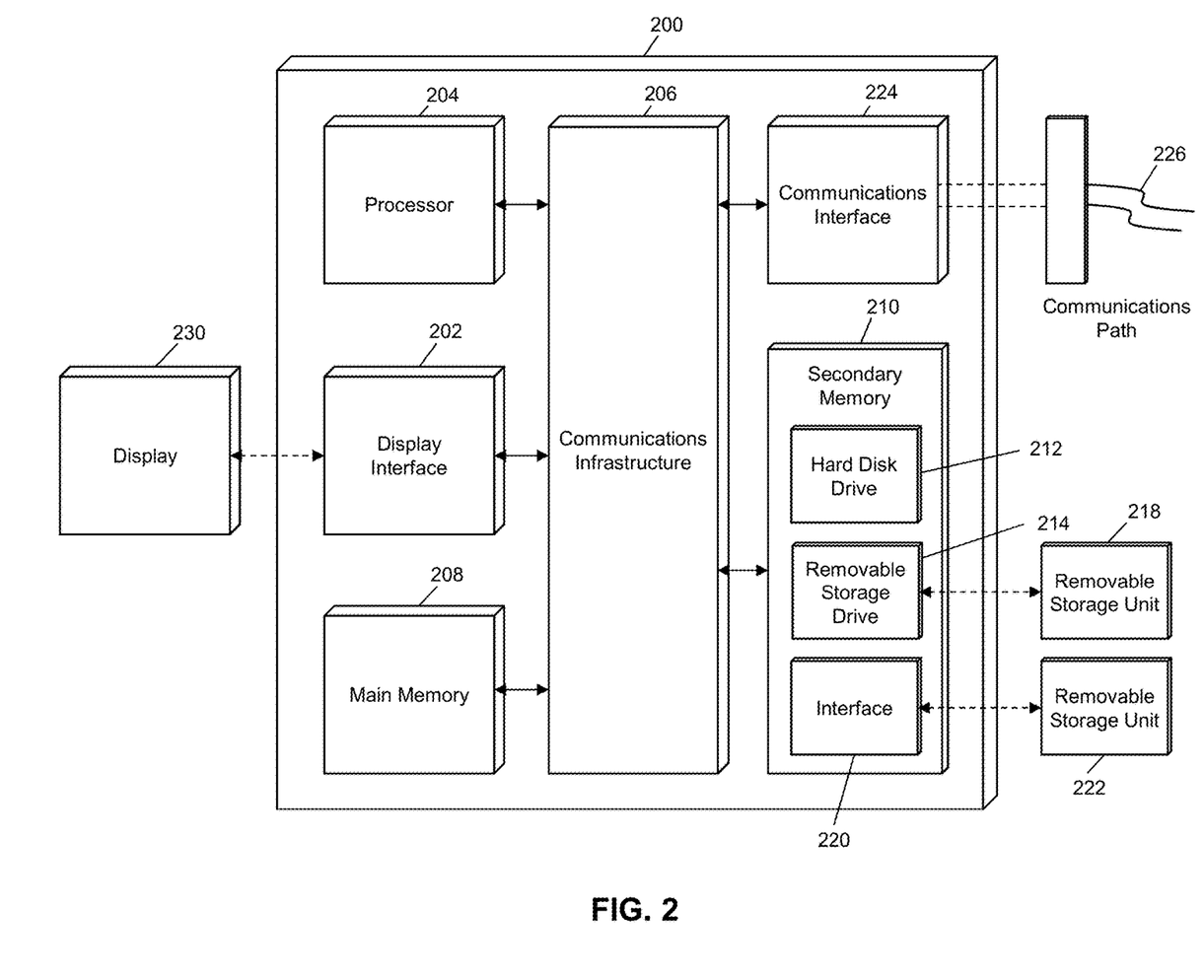
FIG. 2 is an exemplary hardware structure for an embodiment of a computer system for an automated smart error recovery and detection mechanism along with corrective action for HDMI related issues.

FIG. 2 illustrates a representative computer system 200 in which embodiments of the present disclosure, or portions thereof, may be implemented as computer-readable code executed on hardware. For example, the electronic device 102, for example, a set-top box, the optional HDMI compatible device 104, the display device 106, the cable provider server 108, and the cloud server 130 of FIG. 1 may be implemented in whole or in part by a computer system 200 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 204 may be processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data-transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 208 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1 and 3-5, as discussed herein. Accordingly, such computer programs may represent controllers of the computer system 200. Where the present disclosure is implemented using software executed on hardware, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software executed on hardware, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

Exemplary Method and System for an Automated Smart Error Recovery and Detection Mechanism Along with Corrective Action for HDMI Related Issues Bugs, for example, errors can be reported which are very specific or are limited only to certain unique customers, for example, due to defective models of televisions (TVs) or due to limitation in capabilities of the television. In some circumstance, it is possible to solve the error, for example, by waiver, which allows the television to function properly by tweaking specific configuration without compromising security. For example, bugs or errors can include (1) audio is not observed in HDMI output connected to a certain television model, for example, TV-Sony-KLV-24R402A on tuning to any channel after code upgrade, (2) buzzing sound or no audio on HDMI playing Netflix videos, and (3) some, for example, HDMI televisions, for example, cannot handle AC3 audio (e.g., Dolby digital) if audio is muted when changing channels. In accordance with an exemplary embodiment, after such unique set of televisions are identified, challenges exist is addressing these problems since frequent firmware upgrade may be tedious, which the customer may not like, and the fix usually cannot be generalized to all working set of televisions. Accordingly, it would be desirable to have cloud-based triggers (with action set) targeted for specific customer scenarios.

In accordance with an exemplary embodiment, a method is disclosed of a cloud based HDMI error recovery mechanism. Currently HDMI software/firmware functionality along with configuration and settings are uniform across groups of display devices, for example, television models that support HDMI. There are cases of specific display devices or television models that exhibit defective behavior and/or that exhibit relatively poor behavior. Examples of such cases can include audio problems as set forth above. Generally, these audio problems require customer actions (i.e., a customer fix) at the electronic device 102 (for example, at the set-top box), which need to be completed without compromising the security of the electronic device 102. In addition, it would be desirable that the fix can be completed rather than requiring the customer, for example, to replace their current television model with a new or different television. Generic firmware upgrades with conditional actions can also be tedious and costly to maintain. Hence, it would be desirable to have cloud-based actions that are configured to target specific customer devices, for example, display device 106, and which can be triggered, for example, by standard or proprietary events. For example, the following table targets specific customers having exceptional (e.g. unusual or not typical) televisions (e.g., specific model) with recommended top-up action list that can be maintained, for example, in a cloud server 130 hosted, for example, by a cable service provider:

| Customer Device model, unique ID ranges | TV models with defect or poor behavior | Trigger action list |
| --- | --- | --- |
| Name: MediaGateway UID: XXXXX-YYYYY-ZZZ | Model: Sony projector - XYZ Problem: No audio support, but EDID reported audio support with wrong sampling rate | 1. Mute audio 2. Allow video transmission |
| Name: set-top box UID: AAAAA-BBBBB-CCC | Model: Samsung-ABC Problem: Buzzing Sound or No Audio on HDMI Playing Netflix Videos | 1. Pass thru audio signal to TV OR 2. Disable a condition of preventing unsupported audio format |

In accordance with an exemplary embodiment, an action list shown above can be added or triggered from the cable provider server 108 and/or the cloud server 130 to an electronic device 102 (e.g., set-top box) over either standard protocol (like TR069) or a proprietary method. The electronic device 102 can then retrieve or fetch the action list details and store it locally within the electronic device 102. When a display device 106, for example, a television is connected to the electronic device 102, the electronic device 102 can check to determine if the specific model matches a list of specific models of televisions in a database with corresponding recommended top-up actions. If yes, the electronic device 102 can then execute one or more of the top-up actions suggested in "trigger action list" along with regular HDMI functionality.

Figure 3:
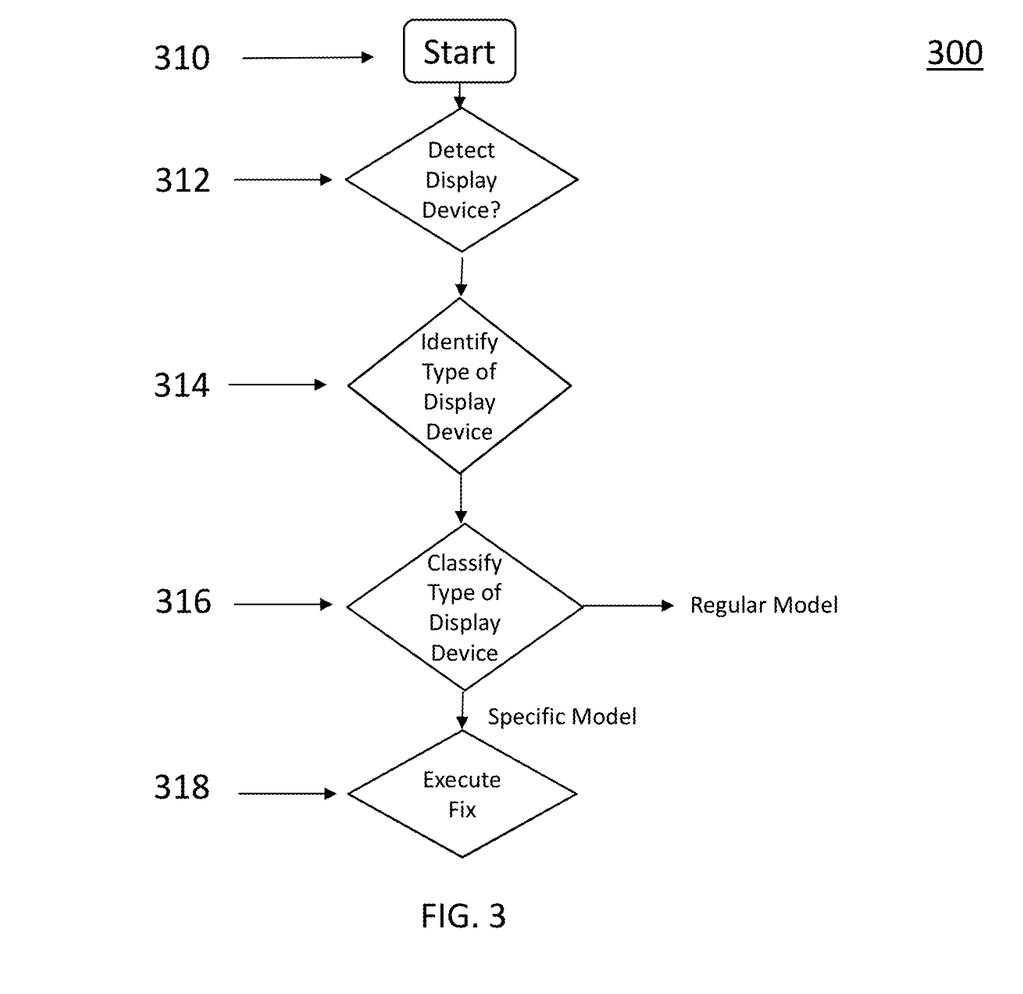
FIG. 3 is a flow chart illustrating a method of automated error detection in accordance with an exemplary embodiment.

FIG. 3 is a flow chart 300 illustrating a method of automated error detection in accordance with an exemplary embodiment. As shown in FIG. 3, the process starts 310 and in step 312, an electronic device 102, for example, a set-top box, detects if a display device 106 has been connected to the electronic device 102, for example, via a HDMI cable 120, 122. If a display device 106 is detect in step 312, in step 314, the electronic device 102 identifies the type of display device 106. In step 316, the electronic device 102 classifies the display device 106 as a regular television model or specific television model. In step 318, if the display device 106 is classified as a specific television model, a fix is executed on the electronic device 102 to address any potential defective behavior or known capability limitations of the specific television model.

Figure 4:
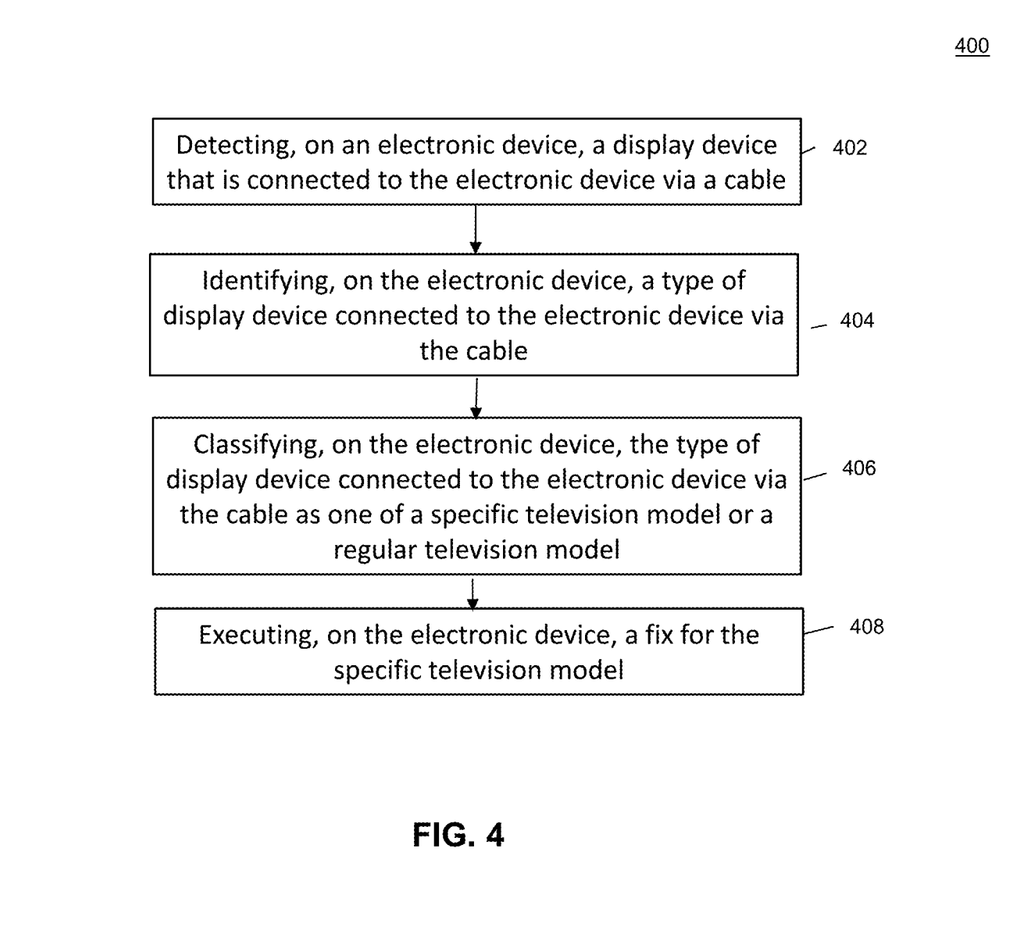
FIG. 4 is another flow chart illustrating a method of automated error detection in accordance with an exemplary embodiment.

FIG. 4 is another flow chart 400 illustrating a method of automated error detection in accordance with an exemplary embodiment. As shown in FIG. 4, in step 402, on an electronic device 102, a display device 106 connected to the electronic device via a cable is detected. In step 404, a type of display device 106 connected to the electronic device via the cable 120, 122 is identified on the electronic device 102. In step 406, the type of display device 106 connected to the electronic device 102 via the cable 120, 122 is classified by the electronic device as one of a specific television model or a regular television model. In step 408, a fix for the specific television model is executed on the electronic device 102.

In accordance with an exemplary embodiment, the electronic device 102, can receive from a cloud server 130, a list of fixes for one or more specific television models. In addition, the electronic device 102 can receive from the cloud server 130, the list of fixes upon a triggering event. For example, the triggering event can be related to the specific television model exhibiting defective or poor behavior. In accordance with an exemplary embodiment, for example, the fix can be to mute an audio signal to the display device and allow a transmission of a video signal via an HDMI cable. Alternatively, the fix can be to pass an audio signal through to the display device and disable a condition preventing an unsupported audio format on the electronic device 102.

In accordance with another embodiment, some of the bugs or errors can be due to a defective cable or loose connection between the electronic device 102 and the display devise 106. For example, continuous extended display identification data (EDID) reading causing, for example, HAL to hang when the HDMI cable data line is cut. Accordingly, it would be desirable to be able to identify whether a loose connection or a defective cable is present and notify the customer of the problem through alternative mechanism.

In accordance with another exemplary embodiment, a method is disclosed of auto detection HDMI cable faults and smart notification. For example, a method is disclosed that identifies HDMI cable-related problems and a recommended suggestion is sent to the user or customer to implement a fix that might be carried out by the customer or another person at the customer premises. For example, a HDMI transmitter attempting to read EDID data of receiver and receiving an error, and/or a continuous read causing an error can indicate a problem of a broken cable. In accordance with an exemplary embodiment, a recommendation can be made to the customer, for example, a prompt or communication can be sent to the customer to replace the HDMI cable 120, 122 as a fix.

In accordance with another embodiment, a HDMI transmitter can be receiving spurious hot plug events, which when detected can be indicative of a loose connection in the HDMI cable 120, 122. In accordance with an embodiment, the recommendation to the user or customer 142 can include prompting the user or customer 142 to properly connect or insert the HDMI cable 120, 122 into the electronic device 102 as a different fix. There can be many other scenarios.

In the above scenarios, because the notifications may not or cannot be displayed or announced on the display device 106 (e.g., television), alternative approaches/options can be used, for example, an inbuilt speaker or voice interface on the electronic device (or transmitter device) 102 can be used to announce the recommendation. In accordance with another exemplary embodiment, the notifications can be sent, for example, using Bluetooth proximity audio devices to notify the user or customer 142, and/or a cloud server 130 can send short message server (SMS) or text notifications to a registered mobile device 140 of the user and/or customer 142.

In accordance with another embodiment, some bugs or errors reported by customer can be due to unbranded repeaters arranged between the electronic device 102, for example, a set-top box (STB) and the display device 106, for example, a television (TV) causing connection failure (for example, a HDCP handshake failure).

In accordance with another embodiment, a customer 142 may connect one or more HDMI compatible device 104, for example, sound bars or repeaters, which are connected to the display device (or television) 106. Customers can experience problems like being unable to receive video or audio on the display device (or television) 106. In this case, HDMI transmitter can identify whether the HDMI compatible device 104 (e.g. receiving device) is a repeater by checking 'REPEATER' bit. For example, unbranded HDMI repeaters can exhibit problems like inconsistent HDCP failure due to authentication timeout. Accordingly, when an unbranded HDMI repeater is identified, a recommendation can be given to the customer or user 142 to either connect the display device (or television) 106 directly to electronic device (e.g., transmitting device) 102, for example, a set-top box, or use the branded model of repeater as yet another possible fix. In addition, the customer or user 142 can be notified of the problem via a voice message from the display device 102, and/or via a Bluetooth device or SMS (short message service) or text message to a registered mobile device 140 of the customer or user 142.

Figure 5:
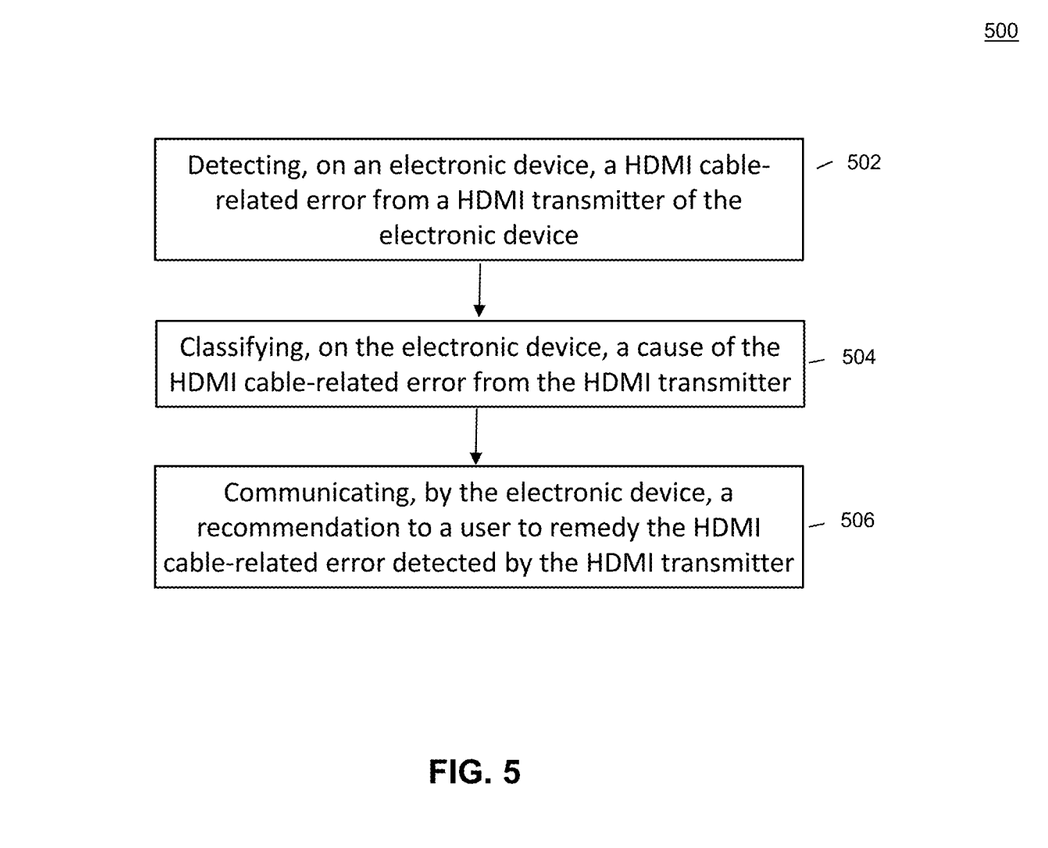
FIG. 5 is a flow chart illustrating a method for automated error detection in accordance with an exemplary embodiment.

FIG. 5 is a flow chart 500 illustrating a method for automated error detection in accordance with an exemplary embodiment. As shown in FIG. 5, in step 502, an electronic device 102 detects a HDMI cable-related error from a HDMI transmitter of the electronic device 102. In step 504, the electronic device 102 classifies a cause of the HDMI cable-related error from the HDMI transmitter. In step 506, the electronic device communicates a recommendation to a user 142 to remedy the HDMI cable-related error detected by the HDMI transmitter.

In accordance with an exemplary embodiment, the recommendation to the user can be to remedy the HDMI cable-related error is to replace a HDMI cable 120, 122. In accordance with another exemplary embodiment, the recommendation to the user to remedy the HDMI cable-related error can be to properly connect or insert the HDMI cable 120, 122 into the electronic device 102. The recommendation to the user to remedy the HDMI cable-related error can be announced, for example, via inbuilt speaker or a voice interface on the electronic device 102, a Bluetooth proximity audio device, or a SMS notification sent to a registered mobile device 140 of the user 142.

In accordance with an exemplary embodiment, an optional HDMI device that is not compatible with the electronic device 102 can result in a recommendation to the user to remedy the HDMI cable-related error: for example, recommending that the device 106 be connected directly to the electronic device 102, or alternatively recommending that the optional HDMI device be replaced by an HDMI compatible device 104 that is compatible with the electronic device 102, for example, a branded repeater.

Techniques consistent with the present disclosure provide, among other features, a method and system for an automated smart error recovery and detection mechanism along with corrective action for HDMI related issues. While various exemplary embodiments of the disclosed method and system have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for automated error detection, the method comprising:
   detecting, on an electronic device, a HDMI cable-related error from a HDMI transmitter of the electronic device;
   classifying, on the electronic device, a cause of the HDMI cable-related error from the HDMI transmitter; and
   communicating a recommendation to a user to remedy the HDMI cable-related error detected by the HDMI transmitter, wherein the recommendation to the user to remedy the HDMI cable-related error is sent, by a cloud server, via SMS notification to a registered mobile device of the user.

2. The method according to claim 1, wherein the recommendation to the user to remedy the HDMI cable-related error is to replace a HDMI cable.

3. The method according to claim 1, wherein the recommendation to the user to remedy the HDMI cable-related error is to properly connect or insert a HDMI cable into the electronic device.

4. The method according to claim 1, wherein the recommendation to the user to remedy the HDMI cable-related error was triggered by an optional HDMI device that is not compatible with the electronic device, and the method further comprising:
   recommending that the display device be connected directly to the electronic device or recommending that the optional HDMI device is an HDMI compatible device that is compatible with the electronic device.

5. The method according to claim 4, wherein the optional HDMI device is a sound bar or a repeater.

6. The method according to claim 1, wherein the electronic device is a set-top box.

7. A system comprising:
   a set-top box; and
   a cloud server,
   wherein the set-top box includes a processor configured to:
      detect a HDMI cable-related error from a HDMI transmitter of the set-top box;
      classify a cause of the HDMI cable-related error from the HDMI transmitter; and
      communicate a recommendation to a user to remedy the HDMI cable-related error being detecting by the HDMI transmitter,
   wherein the recommendation to the user to remedy the HDMI cable-related error is sent, by the cloud server, via a SMS notification to a registered mobile device of the user.

8. The set-top box according to claim 7, wherein the recommendation to the user to remedy the HDMI cable-related error is to replace a HDMI cable.

9. The set-top box according to claim 7, wherein the recommendation to the user to remedy the HDMI cable-related error is to properly connect or insert the HDMI cable into the set-top box.

10. The set-top box according to claim 7,
    wherein the recommendation to the user to remedy the HDMI cable-related error was triggered by an optional HDMI device that is not compatible with the set-top box; and wherein the recommendation is that the display device be connected directly to the set-top box or that the optional HDMI device is an HDMI compatible device that is compatible with the set-top box.

11. The set-top box according to claim 10, wherein the optional HDMI device is a sound bar or a repeater.

\* \* \* \* \*